(12) United States Patent
Bae

(10) Patent No.: US 8,194,802 B2
(45) Date of Patent: Jun. 5, 2012

(54) APPARATUS AND METHOD FOR DETECTING CYCLIC PREFIX LENGTH IN MOBILE COMMUNICATION SYSTEM

(75) Inventor: Do-Hyun Bae, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 758 days.

(21) Appl. No.: 12/233,767

(22) Filed: Sep. 19, 2008

(65) Prior Publication Data

US 2009/0074100 A1    Mar. 19, 2009

(30) Foreign Application Priority Data

Sep. 19, 2007 (KR) ........................ 10-2007-0095073

(51) Int. Cl.
*H04L 27/06* (2006.01)

(52) U.S. Cl. ........ 375/343; 375/260; 375/267; 375/299; 375/340; 455/101; 455/132; 455/296; 455/500; 370/203; 370/204; 370/206; 370/208; 370/210; 370/480

(58) Field of Classification Search .................. 375/260, 375/267, 299, 340, 343; 455/101, 132, 296, 455/500; 370/203, 204, 206, 208, 210, 480
See application file for complete search history.

(56) References Cited

U.S. PATENT DOCUMENTS

| 7,336,598 B2* | 2/2008 | Kakura | 370/208 |
| 2005/0265488 A1* | 12/2005 | Jung | 375/340 |
| 2008/0084816 A1* | 4/2008 | Wang | 370/208 |

* cited by examiner

*Primary Examiner* — Leon Flores
(74) *Attorney, Agent, or Firm* — Jefferson IP Law, LLP

(57) ABSTRACT

An apparatus and method for detecting a Cyclic Prefix (CP) length in a mobile communication system are provided. The apparatus includes first, second, third and fourth correlators, an average unit, and a length detector. The first, second, third and fourth correlators respectively correlate first, second, third and fourth CP parts within a frame boundary. The average unit averages the correlation values of the first, second, third and fourth correlators. The length detector determines the CP as an extended CP if the average value minus the correlation value of the fourth correlator is greater than a first threshold value. Accordingly, less memory may be required to determine a CP length as compared to the conventional art.

14 Claims, 9 Drawing Sheets

APPARATUS AND METHOD FOR DETECTING CYCLIC PREFIX LENGTH IN MOBILE COMMUNICATION SYSTEM

PRIORITY

This application claims the benefit under 35 U.S.C. §119(a) of a Korean patent application filed in the Korean Intellectual Property Office on Sep. 19, 2007 and assigned Serial No. 2007-95073, the entire disclosure of which is hereby incorporated by reference.

BACKGROUND OF THE INVENTION

1. Field of the Invention

The present invention relates generally to an apparatus and method for detecting a Cyclic Prefix (CP) length in a mobile communication system. More particularly, the present invention relates to an apparatus and method for detecting a CP length in a Long-Term Evolution (LTE) communication system terminal.

2. Description of the Related Art

A Long-Term Evolution (LTE) communication system uses Orthogonal Frequency Division Multiplexing (OFDM) in a downlink. Therefore, it is necessary to add a Cyclic Prefix (CP) to each data symbol in the downlink in order to prevent Inter-Symbol Interference (ISI). Furthermore, depending on channel delay spreads, the CP may have either a normal length or an extended length.

The use of Fast Fourier Transform (FFT) is necessary to demodulate the data symbol in a system using OFDM. Accordingly, it is essential to know the length of the CP so that it can be discarded or otherwise ignored as part of the FFT process, leaving only the data for demodulation. Also, knowing the CP length is essential for initial terminal synchronization.

Specifically, knowing the CP length is essential in detecting a Secondary-Synchronization CHannel (S-SCH) in the LTE communication system. Since the S-SCH is located in a symbol directly before an OFDM symbol for transmission of a Primary-Synchronization CHannel (P-SCH), it is not possible to know whether the CP length is the normal type or the extended type.

In general, a correlation operation is performed in a frequency domain in order to detect the S-SCH. In this case, foreknowing the CP length is essential for FFT of an OFDM symbol.

FIG. 1 is a block diagram illustrating a conventional CP length detector.

FIG. 1 illustrates an apparatus for calculating an average value of CP correlation. For calculation of the CP correlation average value, it is understood that 7 OFDM symbols are contained in each slot (i.e. 64 samples=10×1+9×6) when a normal CP is used and 6 OFDM symbols are contained in each slot (i.e. 192 samples=32×6) when an extended CP is used.

In consideration of a frame structure for each case, an enable control signal is used to determine whether to move a calculation interval for a CP correlation average value.

A 64-point moving average unit 130 calculates a CP correlation average value for a 64-point interval, and a 192-point moving average unit 140 calculates a CP correlation average value for a 192-point interval.

A normalization/determination unit 150 determines and detects a CP length on the basis of the CP correlation average value calculated by the 64-point moving average unit 130 and the 192-point moving average unit 140.

Referring to FIG. 1, a memory size is estimated on the assumption that a 5-ms half frame boundary is known by P-SCH detection.

That is, on the assumption that the 5-ms half frame boundary is known, an accurate slot boundary in a serving cell is calculated and a CP length is determined accordingly.

Whether a CP is a normal type or an extended type is determined according to the determined CP length.

In this case, a necessary memory size is about 3072 bits (i.e. 64+192 samples×12 bits/sample). Such a memory size may vary slightly depending on the number of valid bits of a cumulative value resulting from the correlation. Herein, it is set to 12 bits.

However, there may be a case in which the 5-ms half frame boundary is unknown, i.e., the case that the CP length is detected simultaneously with the P-SCH detection.

In this case, a search time can be reduced. However, all the information from 1 slot (e.g., 960 samples) must be stored because there is no information about the 5-ms half frame boundary. In this case, an estimated memory size is about 11520 bits (i.e. 960 samples×12 bits/sample), which is about four times the normal case.

Also, in this case, there is a higher probability that an extended CP is misinterpreted as a normal CP.

SUMMARY OF THE INVENTION

An aspect of the present invention is to address at least the above-mentioned problems and/or disadvantages and to provide at least the advantages described below. Accordingly, an aspect of the present invention is to provide an apparatus and method for detecting a CP length in a mobile communication system.

Another aspect of the present invention is to provide an apparatus and method for detecting a CP length in a mobile communication system more accurately even without knowing a 5-ms half frame boundary.

Still another aspect of the present invention is to provide an apparatus and method for detecting a CP length in a mobile communication system, which can perform the CP length detection simultaneously with P-SCH detection, can increase the accuracy, can reduce the search time, and can reduce the necessary memory size.

In accordance with an aspect of the present invention, an apparatus for detecting a CP length in a mobile communication system is provided. The apparatus includes a first correlator for correlating a first CP part within a frame boundary, a second correlator for correlating a second CP part within a frame boundary, a third correlator for correlating a third CP part within a frame boundary, a fourth correlator for correlating a fourth CP part within a frame boundary, an average unit for averaging the correlation values of the first, second, third and fourth correlators, and a length detector for determining the CP as an extended CP if the average value minus the correlation value of the fourth correlator is greater than a first threshold value.

In accordance with another aspect of the present invention, a method for detecting a CP length in a mobile communication system is provided. The method includes correlating first, second, third and fourth CP parts within a frame boundary, averaging the correlation values of the first, second, third and fourth CP parts, and determining the CP as an extended CP if the average value minus the correlation value of the fourth CP part is greater than a first threshold value.

In accordance with still another aspect of the present invention, a method for detecting a CP length in a mobile communication system is provided. The method includes storing a received signal in a shift register, dividing a first group of samples of the received signal into a plurality of CP parts, correlating each of the plurality of CP parts within a frame boundary of the received signal, averaging the correlation values of the plurality of CP parts, and determining the CP as an extended CP if the average value minus the correlation value of the last of the plurality of CP parts is greater than a first threshold value.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, it should be noted that like reference numbers are used to depict the same or similar elements, features and structures.

DETAILED DESCRIPTION OF THE EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for determining a Cyclic Prefix (CP) length in a mobile communication system.

Additionally, exemplary embodiments of the present invention perform blind detection because a normal CP and an extended CP can be selectively used under the condition that no upper information is received in detection of a CP length.

In exemplary embodiments of the present invention, a necessary memory size is 7680 bits (=(32+128)×12×4) which is a reduction of over 30% from the memory size of 11520 bits in the conventional art. Accordingly, exemplary embodiments of the present invention provide a method for reducing the necessary memory size. Additionally, exemplary embodiments of the invention reduce a probability that an extended CP is misinterpreted as a normal CP.

Figure 1:
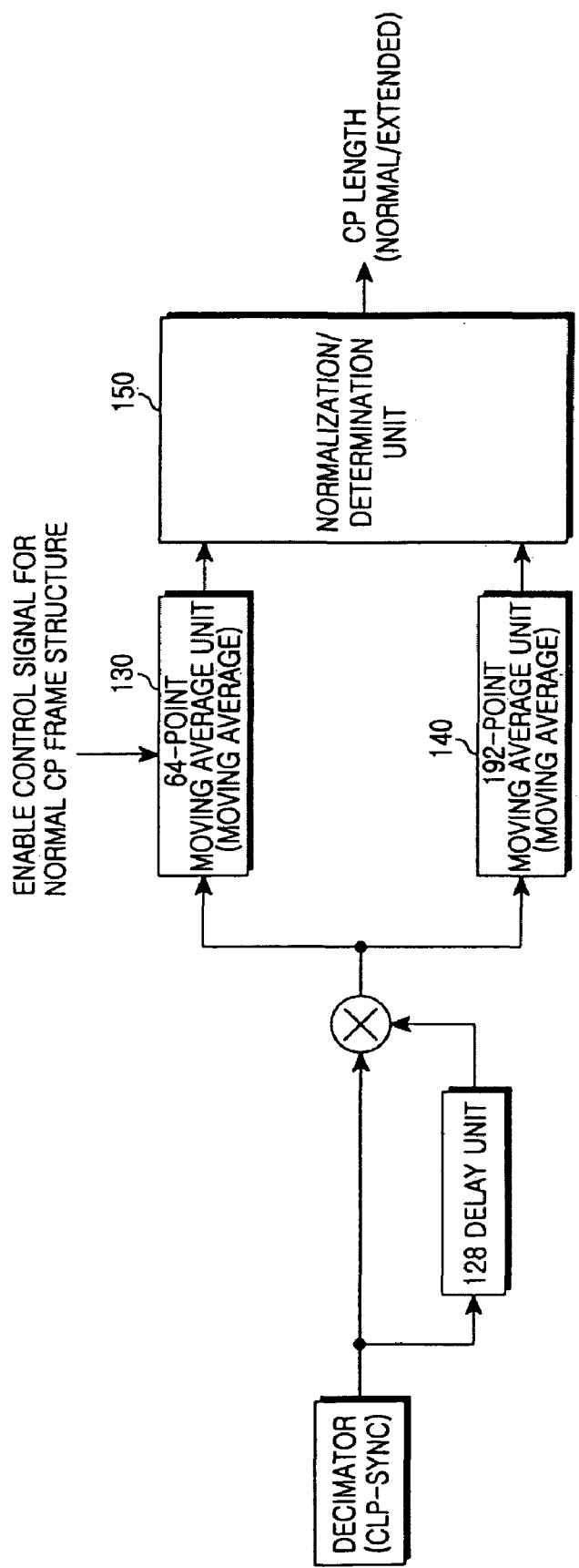
FIG. 1 is a block diagram illustrating a conventional CP length detector.
Figure 2:
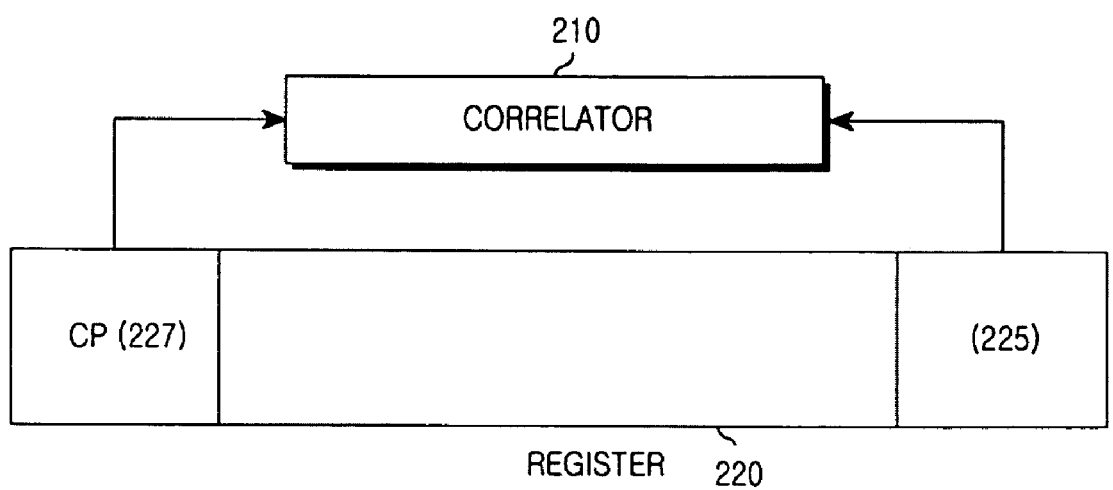
FIG. 2 is a diagram illustrating a correlation operation according to an exemplary embodiment of the present invention.

FIG. 2 is a diagram illustrating a correlation operation according to an exemplary embodiment of the present invention.

Referring to FIG. 2, input signals r[n] are input into a CP length detector and are sequentially stored in a register 220 (e.g., a LeFt Shift Register (LFSR)).

Thereafter, a correlator 210 correlates a CP 227 and a CP 225 of a preamble part on a register-by-register basis in response to a clock signal.

Exemplary embodiments of the present invention integrate a register for a normal CP and a register for an extended CP into a single unit, instead of using separate units for each.

Figure 3:
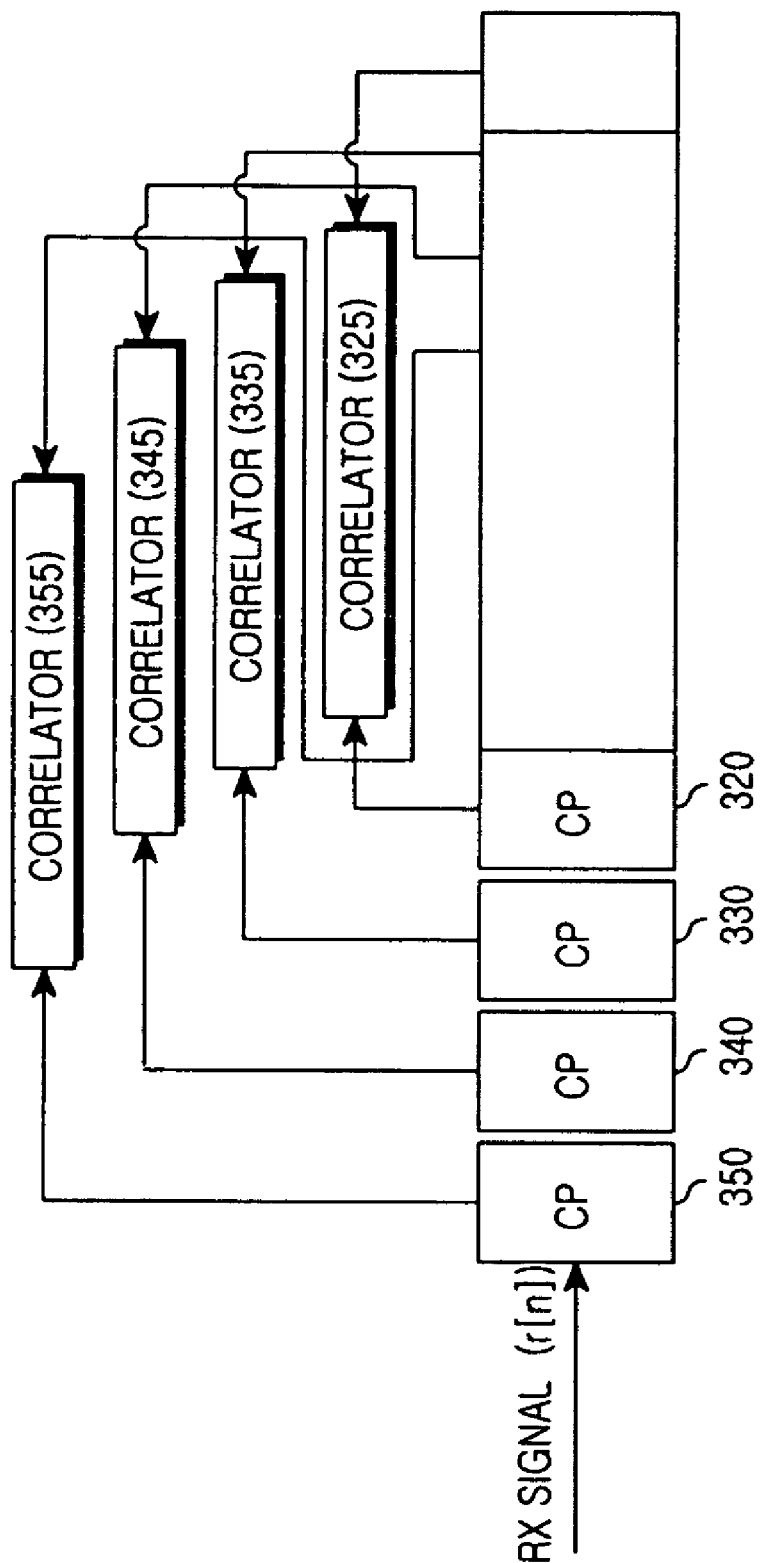
FIG. 3 is a diagram illustrating a correlation operation for detection of a CP length according to an exemplary embodiment of the present invention.

FIG. 3 is a diagram illustrating a correlation operation for detection of a CP length according to an exemplary embodiment of the present invention.

Referring to FIG. 3, for calculation of a CP correlation average value, it is understood that 7 OFDM symbols are contained in each slot (64 samples=10×1+9×6) when a normal CP is used and 6 OFDM symbols are contained in each slot (192 samples=32×6) when an extended CP is used.

That is, when a signal is transmitted using a normal CP, 7 OFDM symbols are allocated to each slot. The length of the CP in the first of the 7 OFDM symbols includes 10 samples while the length of each CP in the remaining 6 symbols includes 9 samples. When a signal is transmitted using an extended CP, 6 OFDM symbols are allocated to each slot, due to the larger size of the CP, and each CP in each of the 6 symbols includes 32 samples.

Correlators 355, 345, 335 and 325 divide 32 samples, which is the maximum size of a CP, into 4 sub-blocks 350, 340, 330 and 320 and perform partial correlation to calculate an intermediate correlation value. The 32 samples divided into the 4 sub-blocks 350-320 have respective correlation lengths of 5, 9, 9 and 9 samples. The correlators determine and store a correlation value for every clock signal.

Dividing the 32 samples into lengths of 5, 9, 9 and 9 samples allows for direct comparison to normal CP length correlation values. The values and sizes of the other correlation values are compared on the basis of the normal CP length correlation values.

Figure 4:
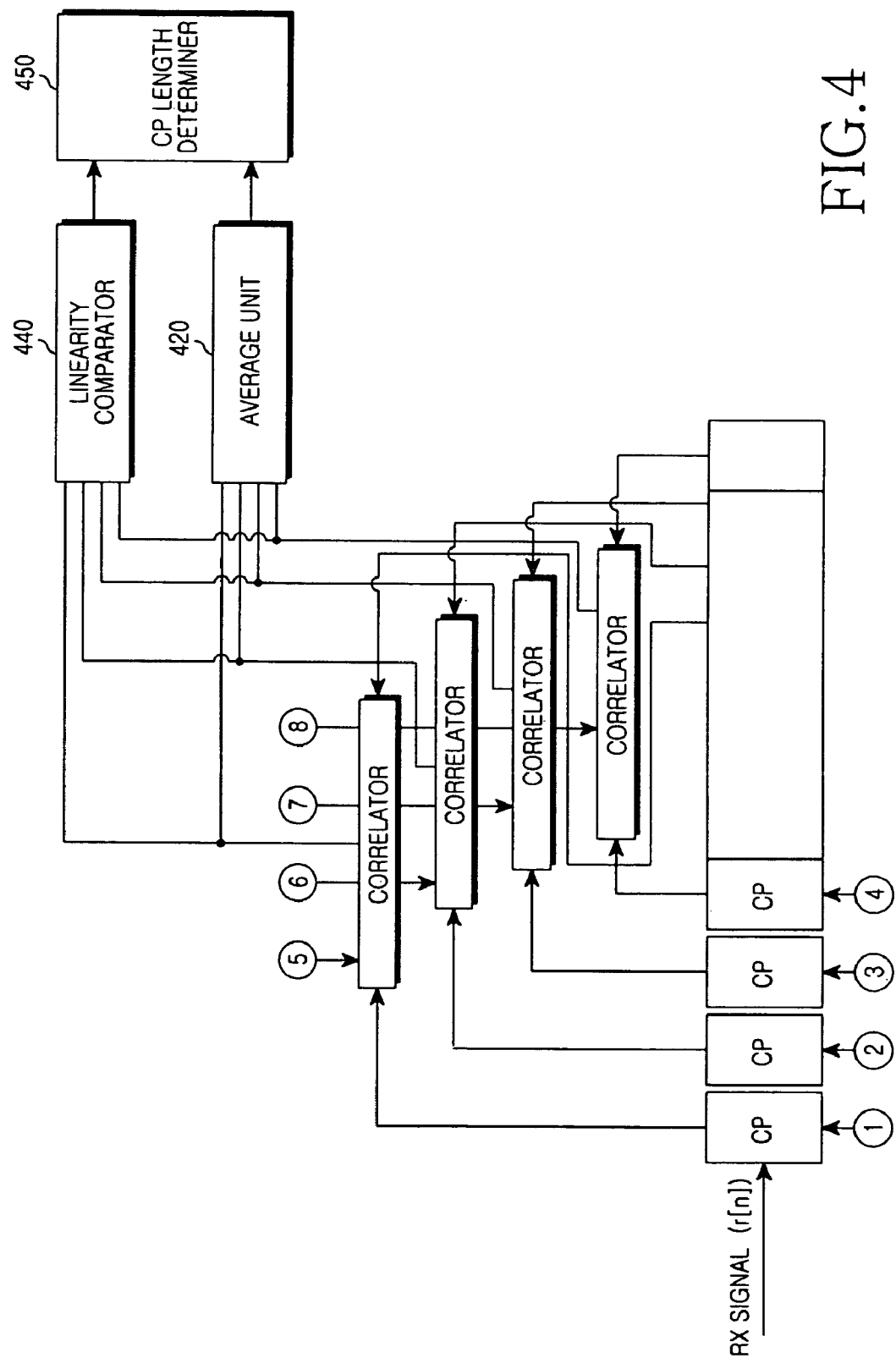
FIG. 4 is a diagram illustrating an operation for detection of a CP length according to an exemplary embodiment of the present invention.

FIG. 4 is a diagram illustrating an operation for detection of a CP length according to an exemplary embodiment of the present invention.

Referring to FIG. 4, for detection of a normal CP length, a CP length can be determined by comparing a correlation value of a correlator 8 and a CP part 4. However, a more accurate value can be estimated by additionally using the correlation values that can be calculated by correlators 5, 6 and 7 using CP parts 1, 2 and 3.

For example, since data are present in parts 1, 2 and 3, a normal CP is very low in an intermediate correlation value itself. This fact can be used to determine whether the CP is a normal CP or an extended CP.

The correlation values for the parts 1, 2, 3 and 4, i.e., the values of the correlators 5, 6, 7 and 8 are summed by a summing unit (not shown) and the average value is calculated by an average unit 420. In an exemplary implementation, the summing unit may be included in the average unit 420 or provided as a separate component.

Also, the linearity of the correlation values for the correlators 5, 6, 7 and 8 is determined by a linearity comparator 440. More specifically, linearity comparator 440 determines whether the correlation values are similar to each other, that is, where there are correlators having significantly different correlation values.

For reference, the normal CP is low in linearity and the extended CP is high in linearity. The reason for this is that the correlation values of the correlators 5, 6, 7 and 8 for the extended CP are similar to each other. In comparison, the correlation values of the correlators 5, 6 and 7 for the normal CP are significantly different from the correlation value of the correlator 8 for the normal CP.

Based on the output of the average unit 420 and the output of the linearity comparator 440, a CP length determiner 450 determines whether the CP of the current symbol is a normal CP or an extended CP.

Figure 5:
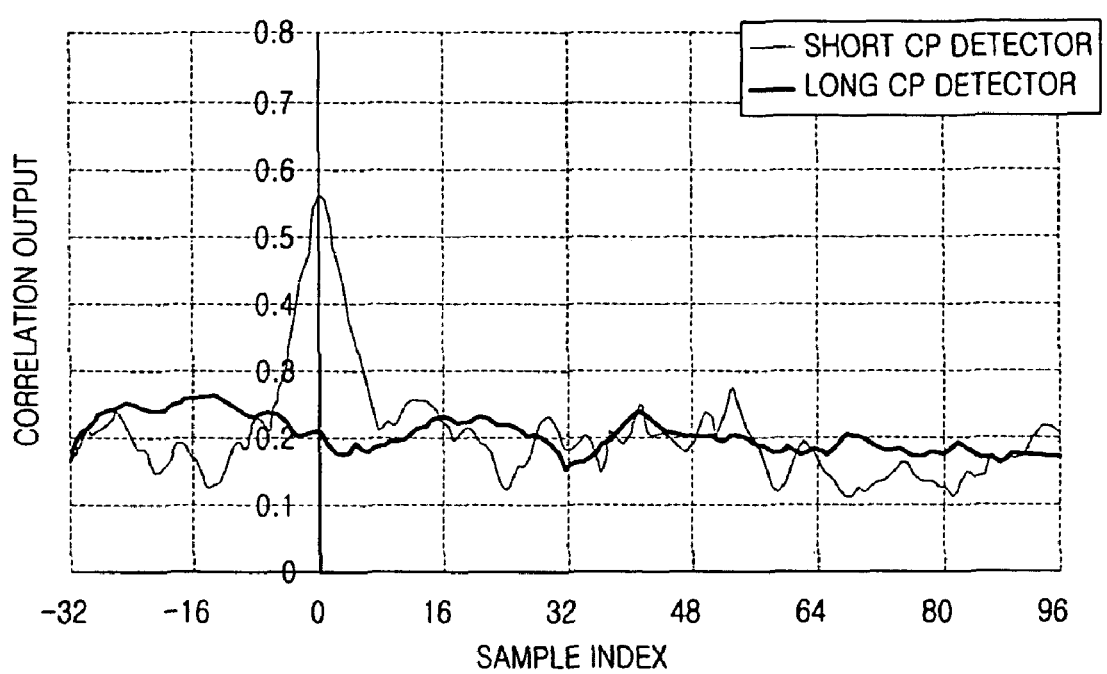
FIG. 5 is a graph illustrating a correlation value for a normal CP according to an exemplary embodiment of the present invention.

FIG. 5 is a graph illustrating a correlation value for a normal CP according to an exemplary embodiment of the present invention.

Referring to FIG. 5, since the maximum correlation value is clearly represented and a slope for the correlation value of a normal CP is large, it can be seen that the variance value is small.

Figure 6:
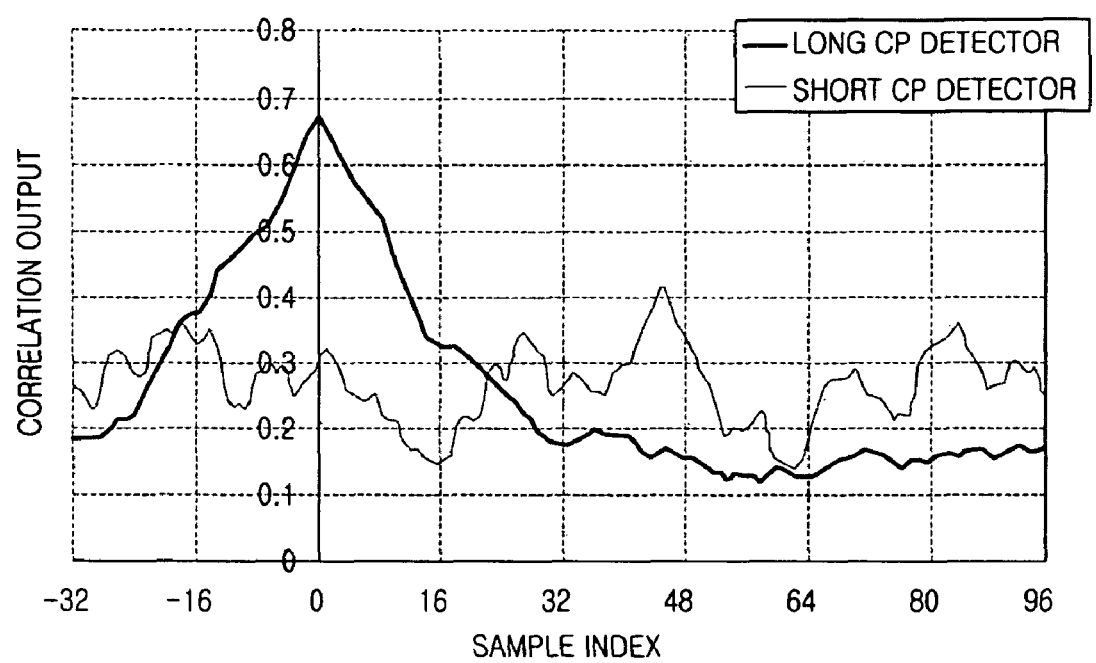
FIG. 6 is a graph illustrating a correlation value for an extended CP according to an exemplary embodiment of the present invention.

FIG. 6 is a graph illustrating a correlation value for an extended CP according to an exemplary embodiment of the present invention.

Referring to FIG. 6, it can be seen that the size of a normal CP correlation value is mainly located at the half part of an extended CP maximum correlation value. Also, it can be seen that the slope of an extended CP correlation value is small and thus the variance value is large.

In this case, it is necessary to prevent an extended CP from being misinterpreted as a normal CP. The ability to distinguish between an extended CP and a normal CP can be achieved using an exemplary method of the present invention.

Exemplary embodiments of the present invention can determine a CP length for 1 symbol. Additionally, a more accurate determination can be performed by increasing the number of times of asynchronous cumulation.

In this case, since the CP length may differ depending on the respective sub-frames, it is necessary to cumulate the correlation values only in the sub-frames.

Figure 7:
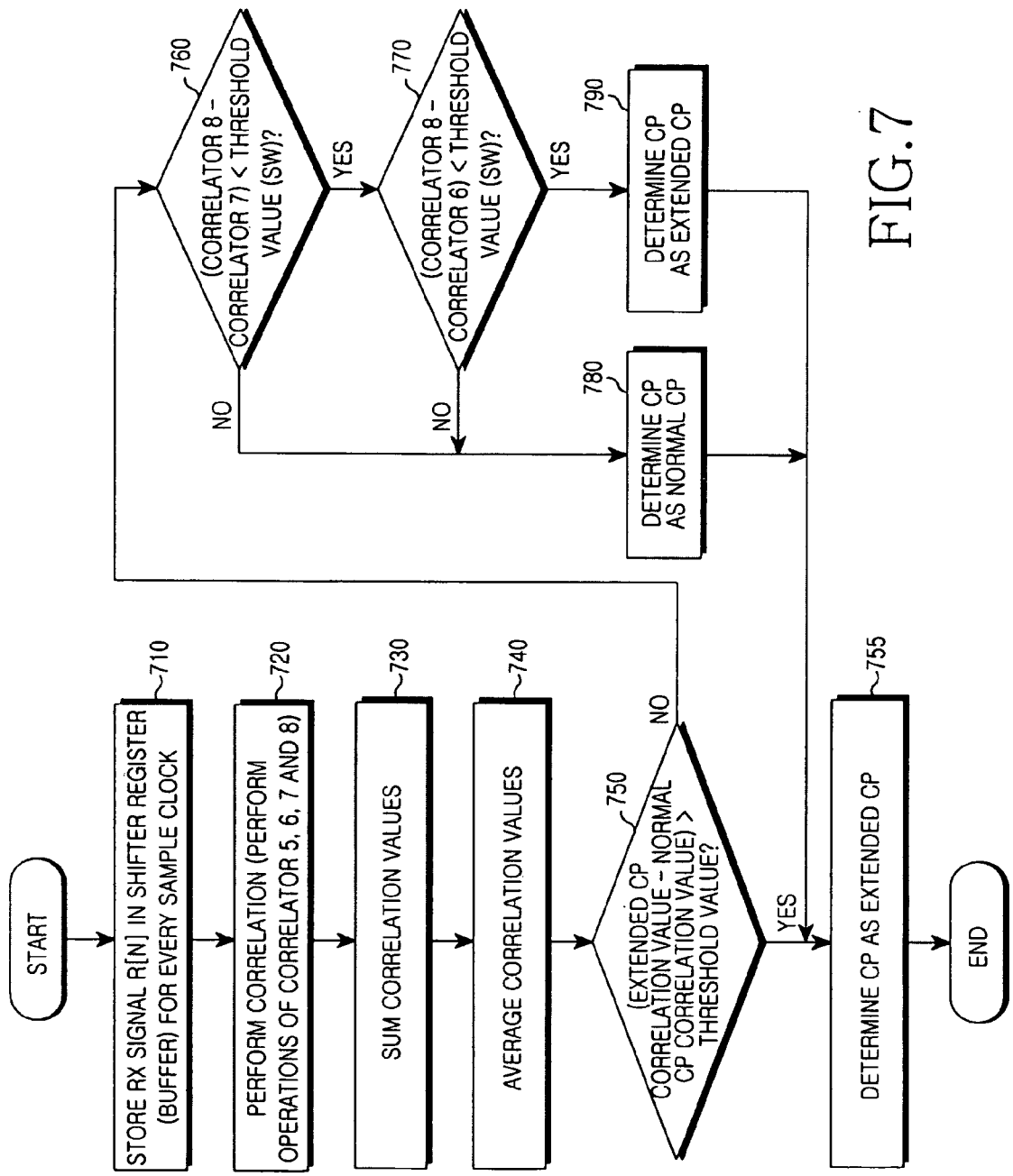
FIG. 7 is a flow chart illustrating a process for detecting a CP length according to an exemplary embodiment of the present invention.

FIG. 7 is a flow chart illustrating a process for detecting a CP length according to an exemplary embodiment of the present invention.

Referring to FIG. 7, in step 710, a CP length detecting apparatus of an exemplary embodiment of the present invention stores a received (RX) signal r[n] in a shifter register for every sample clock signal.

In step 720, the CP length detecting apparatus correlates data stored in the shift register. The correlation of the data stored in the shift register represents the correlation operations of the correlators 5, 6, 7 and 8 of FIG. 4.

In step 730, the CP length detecting apparatus sums the correlation values. In step 740, the CP length detecting apparatus calculates an average value thereof. The average value is used to detect an extended CP. In the above process, the values of the correlators 5, 6, 7 and 8 of FIG. 4 are stored separately. Separate storage of the correlation values is used to detect a normal CP.

In step 750, the CP length detecting apparatus subtracts a normal CP correlation value based on the correlator 8 of FIG. 4 from an extended CP correlation value based on the average correlation value, and determines whether the subtraction result is greater than a threshold value. The threshold value may be determined by a simulated value, a calculated value, or a test value in an actual implementation. Additionally, the threshold values referred to in subsequent steps may also be determined in the same way as the above threshold value.

If the subtraction result value is greater than the threshold value in step 750, the process proceeds to step 755. In step 755, the CP length detecting apparatus determines the CP as an extended CP. Thereafter, the process is ended.

If the subtraction result value is not greater than the threshold value in step 750, the process proceeds to step 760. In step 760, the CP length detecting apparatus determines whether the value of the correlator 8 of FIG. 4 minus the value of the correlator 7 of FIG. 4 is smaller than a threshold value.

If the value of the correlator 8 of FIG. 4 minus the value of the correlator 7 of FIG. 4 is not smaller than the threshold value in step 760, the process proceeds to step 780. In step 780, the CP length detecting apparatus determines the CP as a normal CP. Thereafter, the process is ended.

If the value of the correlator 8 of FIG. 4 minus the value of the correlator 7 of FIG. 4 is smaller than the threshold value in step 760, the process proceeds to step 770. In step 770, the CP length detecting apparatus determines whether the value of the correlator 8 of FIG. 4 minus the value of the correlator 6 of FIG. 4 is smaller than a threshold value.

If the value of the correlator 8 of FIG. 4 minus the value of the correlator 6 of FIG. 4 is not smaller than the threshold value in step 770, the process proceeds to step 780. In step 780, the CP length detecting apparatus determines the CP as a normal CP. Thereafter, the process is ended.

If the value of the correlator 8 of FIG. 4 minus the value of the correlator 6 of FIG. 4 is smaller than the threshold value in step 770, the process proceeds to step 790. In step 790, the CP length detecting apparatus determines the CP as an extended CP. Thereafter, the process is ended.

In summary, for a normal CP, the value of the correlator 8 of FIG. 4 is greatest and the values of the remaining correlators are comparatively small. Thus, when they are subtracted from the value of correlator 8, the difference will be greater than a threshold value. On the other hand, for an extended CP, a difference between the values of all the correlators is smaller than a threshold value.

Figure 8:
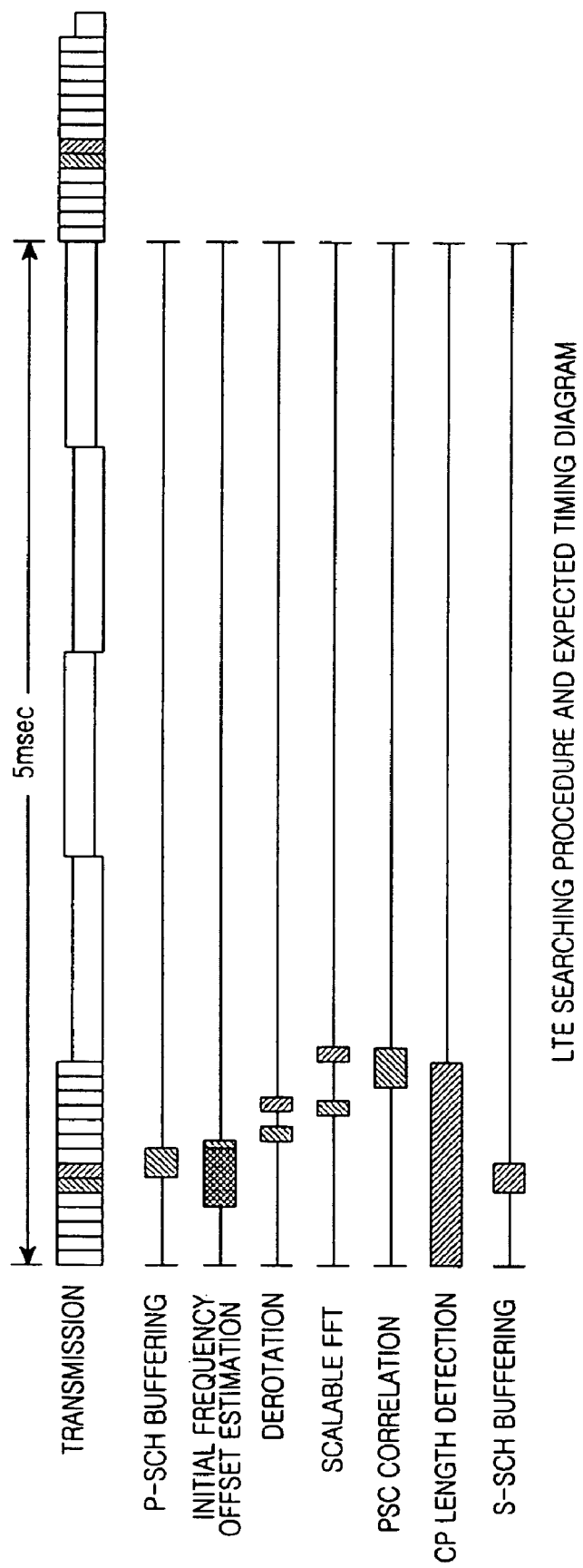
FIG. 8 is a diagram illustrating a CP length detection time according to an exemplary embodiment of the present invention.

As illustrated in FIG. 8, when the 5-ms half frame boundary information is unknown, exemplary embodiments of the present invention can reduce the duration needed for detection of the CP length such that the CP length is detected prior to other blocks.

Also, exemplary embodiments of the present invention can reduce the number of necessary hardware devices by calculating a normal CP and an extended CP in an integrated rather than separate method.

Figure 9:
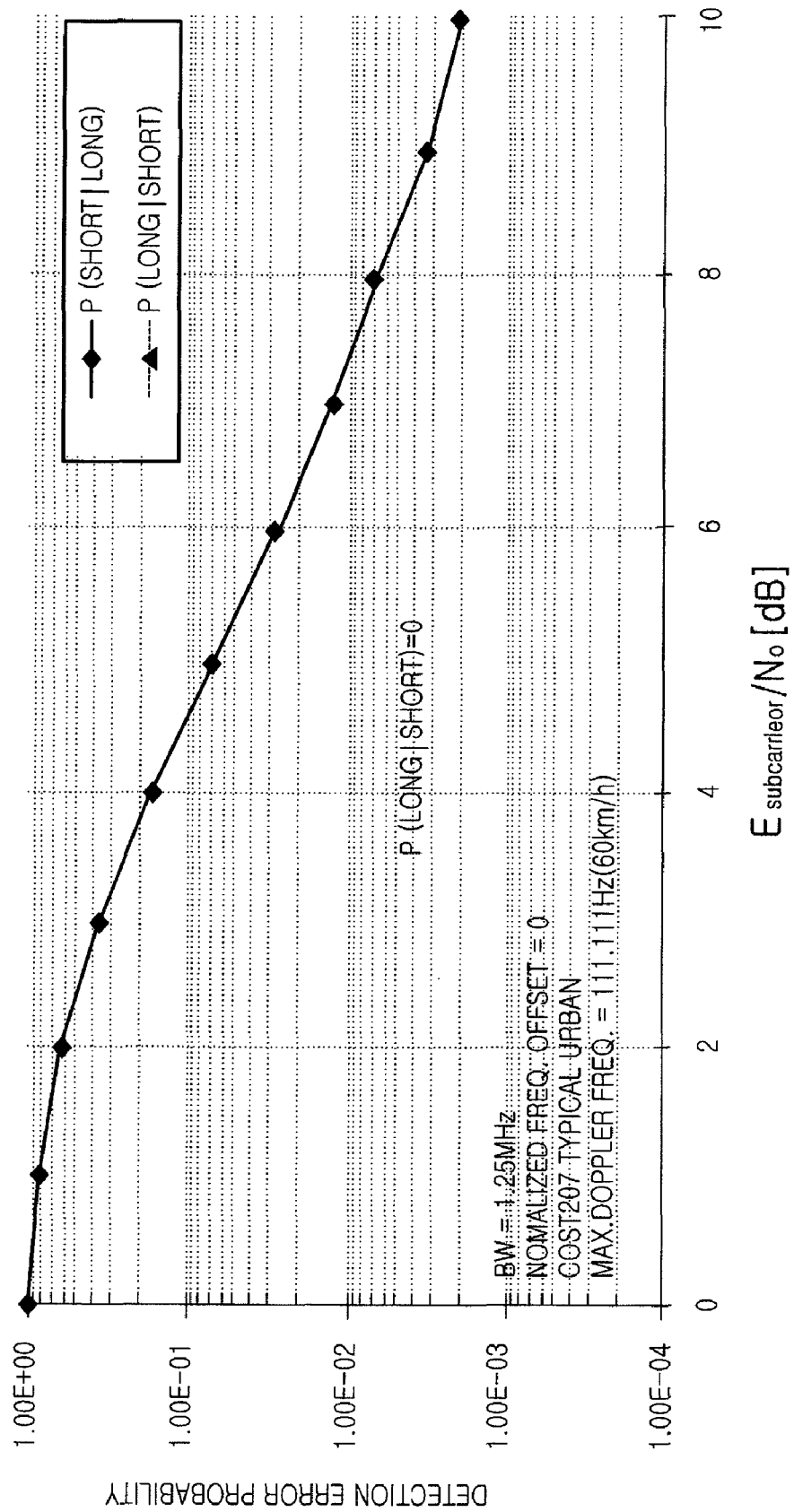
FIG. 9 is a graph illustrating a CP length detection error probability according to an exemplary embodiment of the present invention.

Also, exemplary embodiments of the present invention can prevent an error by accurate detection of a CP length. That is, as illustrated in FIG. 9, in comparison with the conventional art (P(Long/Short)), exemplary embodiments of the present invention can improve the discrimination between a normal CP and an extended CP by linear estimation of an intermediate correlation value.

Although the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for detecting a Cyclic Prefix (CP) length in a mobile communication system, the apparatus comprising:
   a first correlator for correlating a first CP part within a frame boundary;
   a second correlator for correlating a second CP part within the frame boundary;
   a third correlator for correlating a third CP part within the frame boundary;
   a fourth correlator for correlating a fourth CP part within the frame boundary;
   an average unit for averaging the correlation values of the first, second, third and fourth correlators and for generating an average value; and
   a length detector for determining the CP as an extended CP when the average value minus the correlation value of the fourth correlator is greater than a first threshold value.

2. The apparatus of claim 1, further comprising a linearity comparator for comparing the linearity of the correlation values of the first, second, third and fourth correlators.

3. The apparatus of claim 2, wherein the length detector determines a correlation difference value between the fourth correlator and the third correlator provided from the linearity comparator when the average value minus the correlation value of the fourth correlator is not greater than the first threshold value, and determines the CP as a normal CP when the correlation difference value between the fourth correlator and the third correlator is greater than a second threshold value.

4. The apparatus of claim 3, wherein the length detector determines a correlation difference value between the fourth correlator and the second correlator provided from the linearity comparator when the correlation difference value between the fourth correlator and the third correlator is not greater than the second threshold value, and determines the CP as a normal CP when the correlation difference value between the fourth correlator and the second correlator is greater than a third threshold value.

5. The apparatus of claim 4, wherein the length detector determines the CP as an extended CP when the correlation difference value between the fourth correlator and the second correlator is not greater than the third threshold value.

6. A method for detecting a Cyclic Prefix (CP) length in a mobile communication system, the method comprising:
   correlating first, second, third and fourth CP parts within a frame boundary;
   generating an average value by averaging the correlation values of the first, second, third and fourth CP parts; and
   determining the CP as an extended CP when the average value minus the correlation value of the fourth CP part is greater than a first threshold value.

7. The method of claim 6, further comprising:
   calculating a correlation difference value between the fourth CP part and the third CP part when the average value minus the correlation value of the fourth CP part is not greater than the first threshold value; and
   determining the CP as a normal CP when the correlation difference value between the fourth CP part and the third CP part is greater than a second threshold value.

8. The method of claim 7, further comprising:
   calculating a correlation difference value between the fourth CP part and the second CP part when the correlation difference value between the fourth CP part and the third CP part is not greater than the second threshold value; and
   determining the CP as a normal CP when the correlation difference value between the fourth CP part and the second CP part is greater than a third threshold value.

9. The method of claim 8, further comprising:
   determining the CP as an extended CP when the correlation difference value between the fourth CP part and the second CP part is not greater than the third threshold value.

10. A method for detecting a Cyclic Prefix (CP) length in a mobile communication system, the method comprising:
   storing a received signal in a shift register;
   dividing a first group of samples of the received signal into a plurality of CP parts;
   correlating each of the plurality of CP parts within a frame boundary of the received signal;
   generating an average value by averaging the correlation values of the plurality of CP parts; and
   determining the CP as an extended CP when the average value minus the correlation value of the last of the plurality of CP parts is greater than a first threshold value.

11. The method of claim 10, wherein the first group of samples comprise 32 samples, the plurality of CP parts comprise 4 CP parts, the first CP part comprises 5 of the 32 samples, the second CP part comprises 9 of the 32 samples, the third CP part comprises 9 of the 32 samples and the fourth CP part comprises 9 of the 32 samples.

12. The method of claim 11, further comprising:
   calculating a correlation difference value between the fourth CP part and the third CP part when the average value minus the correlation value of the fourth CP part is not greater than the first threshold value; and
   determining the CP as a normal CP when the correlation difference value between the fourth CP part and the third CP part is greater than a second threshold value.

13. The method of claim 12, further comprising:
   calculating a correlation difference value between the fourth CP part and the second CP part when the correlation difference value between the fourth CP part and the third CP part is not greater than the second threshold value; and
   determining the CP as a normal CP when the correlation difference value between the fourth CP part and the second CP part is greater than a third threshold value.

14. The method of claim 13, further comprising: determining the CP as an extended CP when the correlation difference value between the fourth CP part and the second CP part is not greater than the third threshold value.

* * * * *